US012681253B2

(12) United States Patent
Bruecher et al.

(10) Patent No.: US 12,681,253 B2
(45) Date of Patent: Jul. 14, 2026

(54) RAIL ARRANGEMENT, CARRIER ARRANGEMENT AND FIBER-OPTIC DISTRIBUTION SYSTEM

(71) Applicant: Rosenberger-OSI GmbH & Co. OHG, Augsburg (DE)

(72) Inventors: Luis Ernesto Bruecher, Berlin (DE); Jochen Hart, Schwanfeld (DE); Danny Heimer, Miesbach (DE); Sven Schlomka, Munich (DE); Benjamin Weigand, Augsburg (DE); Harald Mayr, Amerdingen (DE)

(73) Assignee: Rosenberger-OSI GmbH & Co. OHG, Augsberg (DE)

( * ) Notice: Subject to any disclaimer, the term of this patent is extended or adjusted under 35 U.S.C. 154(b) by 385 days.

(21) Appl. No.: 18/232,880

(22) Filed: Aug. 11, 2023

(65) Prior Publication Data

US 2024/0053565 A1     Feb. 15, 2024

(30) Foreign Application Priority Data

Aug. 12, 2022     (EP) ..................................... 22190225

(51) Int. Cl.
G02B 6/44                (2006.01)

(52) U.S. Cl.
CPC .................................. G02B 6/4455 (2013.01)

(58) Field of Classification Search
CPC ................ G02B 6/4455; G02B 6/4452; G02B 6/44524; G02B 6/44526; G02B 6/4453
See application file for complete search history.

(56) References Cited

U.S. PATENT DOCUMENTS

| | | | | |
|---|---|---|---|---|
| 5,337,400 | A | * | 8/1994 | Morin ................ G02B 6/44528 |
| | | | | 385/135 |
| 5,717,810 | A | * | 2/1998 | Wheeler ................ H04Q 1/023 |
| | | | | 385/59 |
| 6,095,356 | A | | 8/2000 | Rits |
| 6,418,262 | B1 | * | 7/2002 | Puetz ................ G02B 6/44528 |
| | | | | 385/53 |
| 6,647,197 | B1 | * | 11/2003 | Marrs .................. G02B 6/4455 |
| | | | | 385/134 |
| 2006/0018622 | A1 | | 1/2006 | Caveney et al. |
| 2011/0150407 | A1 | | 6/2011 | Beamon et al. |
| 2011/0268406 | A1 | | 11/2011 | Girand et al. |
| 2015/0362692 | A1 | * | 12/2015 | Grandidge ........... H05K 7/1491 |
| | | | | 29/434 |
| 2016/0033732 | A1 | * | 2/2016 | Giraud ............... G02B 6/44528 |
| | | | | 385/135 |

FOREIGN PATENT DOCUMENTS

| | | |
|---|---|---|
| DE | 20 2005 011459 U1 | 9/2005 |
| DE | 102006034000 A1 | 1/2008 |
| EP | 2564251 A1 | 3/2013 |

* cited by examiner

*Primary Examiner* — Thomas A Hollweg
*Assistant Examiner* — Mary A El-Shammaa
(74) *Attorney, Agent, or Firm* — GRAY ROBINSON, P.A.

(57)          ABSTRACT

A rail arrangement is useful for mounting a carrier unit for a fiber-optic component to a distribution frame. The rail arrangement has a first mounting rail and a separate second mounting rail which are spaced apart from each other and are designed to receive the carrier unit jointly between the mounting rails. Each of the mounting rails has at least one fastening point for fastening the mounting rails to the distribution frame. In some implementations, the carrier unit may comprise a fiber-optic patch panel.

23 Claims, 7 Drawing Sheets

RAIL ARRANGEMENT, CARRIER ARRANGEMENT AND FIBER-OPTIC DISTRIBUTION SYSTEM

CROSS REFERENCE TO RELATED APPLICATIONS

Priority is hereby claimed under 35 U.S.C. Section 119 to European Patent Application No. 22 190 225.7 entitled RAIL ARRANGEMENT, CARRIER ARRANGEMENT AND FIBER-OPTIC DISTRIBUTION SYSTEM which was filed in the European Patent Office on Aug. 12, 2022.

STATEMENT REGARDING FEDERALLY SPONSORED RESEARCH AND DEVELOPMENT

Not applicable.

INCORPORATION BY REFERENCE

European Patent Application No. 22 190 225.7 filed Aug. 12, 2022, entitled RAIL ARRANGEMENT, CARRIER ARRANGEMENT AND FIBER-OPTIC DISTRIBUTION SYSTEM is expressly incorporated herein by reference in its entirety to form part of the present disclosure.

FIELD OF THE INVENTION

The invention relates to a rail arrangement for a carrier unit for a fiber-optic component, in particular for a patch panel, having a first mounting rail and a separate second mounting rail.

The invention also relates to a carrier arrangement, having a carrier unit, in particular a patch panel, and a rail arrangement for the carrier unit.

The invention furthermore relates to a fiber-optic distribution system, having a distribution frame and a plurality of carrier arrangements.

BACKGROUND OF THE INVENTION

In data centers, carrier units, in particular individual trays up to what are referred to as patch panels are sometimes used for producing and distributing data connections, for example via network cables, telephone cables or glass fiber cables. A patch panel of this type generally comprises at least one interface with a certain number of individual connectors or plug-in connectors or same grouped in cassettes. In practice, a plurality of patch panels are frequently installed in different height positions in a common distribution frame, or rack.

For reasons of accessibility to the interfaces of the patch panel for a service engineer, the patch panels or trays can frequently be extended out of the distribution frame as required and, for this purpose, are fastened together with a correspondingly configured carrier housing, or chassis, in the distribution frame, as described, for example, in US 2022/0236510 A1. The carrier housing is mounted rigidly on the distribution frame and has suitable linear pull-out mechanisms for the trays. In order to further increase the connector density, a plurality of patch panels are generally arranged in a common carrier housing.

For reasons of standardization endeavors and as high a degree of modularity as possible, only a limited number of height variants is provided for such carrier housings. Furthermore, the carrier housings can be mounted in the distribution frame only at a discrete spacing—as a multiple of what is referred to as a height unit (U). Arbitrary height scalability is not possible, and therefore storage space in the distribution frame can often not be optimally used. Furthermore, the diversity of configurations is limited and the generally closed carrier housings also provide only restricted access to the patch panels from the rear side and from above.

BRIEF SUMMARY OF THE INVENTION

In view of the known prior art, it is the object of the present invention to provide a rail arrangement for a carrier unit for a fiber-optic component, in particular for a patch panel, with which the storage space in a distribution frame can be better utilized, with simultaneously good accessibility for a service engineer, and with which preferably also the diversity of configurations for carrier units in a common distribution frame can be increased.

The present invention is also based on the object of providing an improved carrier arrangement and a fiber-optic distribution system, with preferably high connector density, good accessibility for a service engineer, and a great diversity of configurations.

The object is achieved for the rail arrangement having the features set out in Claim 1. In terms of the carrier arrangement, the object is achieved by Claim 13, and in relation to the fiber-optic distribution system, by Claim 16. The dependent claims and the features described below relate to advantageous embodiments and variants of the invention.

A rail arrangement for a carrier unit for a fiber-optic component is provided, in particular for a patch panel or a tray, having a first mounting rail and a separate second mounting rail. The mounting rails are spaced apart from one another and are designed to jointly receive the carrier unit between them.

The carrier unit preferably has at least one fiber-optic component (or at least provides the possibility of receiving a fiber-optic component) and can be received movably or immovably or rigidly between the mounting rails. The rail arrangement can be designed in particular to guide the carrier unit movably along at least one degree of freedom (in particular along at least one translation degree of freedom) and/or to provide a fastening or depositing option, for example the supporting surface also mentioned below, for the carrier unit.

The rail arrangement can be suitable in principle for all known and future carrier units. The invention can be particularly advantageously suitable for use with optical trays or patch panels, optionally also for use with optical-electrical trays or patch panels. A tray or patch panel includes optical and/or electrical distribution technology and can have, for example, individual fiber-optic and/or electrical modules or cassettes, individual fiber-optic and/or electrical plug-in connectors (in particular sockets), devices for storing fiber-optic and/or electrical conductors and lines or other optical and/or electrical components. The carrier unit can also be designed only for purely receiving or depositing/storing and/or for splicing lines. Even dummy carrier units or dummy patch panels can be provided, for example having front plates which are intended exclusively to meet an informative purpose, such as labeling panels, or to be in the form of spacers.

The "first mounting rail" and the "second mounting rail" are also sometimes jointly referred to below as "mounting rails".

It is preferably provided that the mounting rails of the rail arrangement are components which are independent of one another and which, even in the mounted state, are not connected to one another—apart from the joint connection to the carrier unit and the joint connection to the distribution frame. In particular, additional connecting struts or connecting plates between the two mounting rails of a joint rail arrangement can be dispensed with.

The mounting rails can in each case be formed integrally. However, a mounting rail may also be a multi-part component.

In the multi-part case which is in principle preferred, provision can be made in particular that the mounting rails each have at least one profile rail and at least one functional component connected to the profile rail or to the profile rails. The functional component is preferably arranged on that side of the mounting rail which faces the carrier unit and has components directly interacting with the carrier unit (e.g. the movement limiting means also mentioned below, etc.). The profile rail can be used as a carrier for the functional component.

The functional component can be designed as a stabilizing rail for the profile rail. In particular in this case, the functional component and the profile rail are connectable to one another (preferably directly), in a mechanically rigid manner (in a force-fitting, form-fitting and/or integrally bonded manner), in particular are latchable to one another. For this purpose, the profile rail can have one or more connecting elements (e.g. a latching recess or an offset) and the functional component can have corresponding connecting elements (e.g. one or more elastic latching elements). However, a movable fastening between profile rail and functional component can also be provided (in particular along or counter to the insertion direction also mentioned below), and therefore the functional component can be used, for example, as a pull-out mechanism to which the carrier unit is connected (in particular directly) in a mechanically rigid manner.

The mounting rails can be formed from a metal component or can at least have metallic components. In particular, the profile rail can be formed from a metal component. For example, the mounting rails, in particular profile rails, can have formed sheet metal parts or can be designed as formed sheet metal parts and produced, for example, within the scope of a punching and bending process.

The mounting rails, in particular the functional components, can also be formed from a plastic or can at least have plastics components. For example, comparatively complex functional features can be produced cost-effectively and with a high degree of accuracy and low component weight within the scope of an injection molding process. Alternatively, however, the configuration of the functional components as a sheet metal part can also be provided.

The two mounting rails preferably run parallel or at least substantially parallel to one another along their longitudinal extents or longitudinal axes.

The two mounting rails are preferably spaced apart from one another along a first translation degree of freedom (corresponding to the width of the rail arrangement). A second translation degree of freedom preferably defines the insertion and extension direction, also mentioned below, for the carrier unit (corresponding to the overall depth of the rail arrangement). The overall height of the rail arrangement is preferably assigned to a third translation degree of freedom. Said three translation degrees of freedom are in each case oriented orthogonally to one another according to the customary definition.

In a minimalistic embodiment, the rail arrangement can comprise, for example, two L-shaped profile rails which form the mounting rails and which can be mounted independently of one another and without mutual connection on the supports of a distribution frame.

L-shaped profile rails can be particularly advantageous to allow mounting of the carrier unit in the vertical direction (i.e. from "above") besides the possibility to mount the carrier unit along the horizontal direction.

According to the invention, provision is made that each of the mounting rails has at least one fastening point for fastening to a distribution frame.

The mounting rails are preferably fastenable to a front side of the distribution frame, in particular from the front. In principle, however, fastening, for example, to the rear side of the distribution frame is also possible, as is fastening in a central portion of the distribution frame.

By means of the at least one fastening point in each case, each mounting rail can be mountable at a suitable fastening position of the distribution frame. For this purpose, the distribution frame preferably has corresponding fastening positions for the individual mounting rails in defined height positions discretely spaced apart from one another. The fastening positions are preferably spaced apart from one another by in each case one third of what is referred to as a height unit (U).

Insofar as a "height unit" is referred to above and below, it is a standardized measurement unit which is typically used for electronic housings, is familiar to a person skilled in the art and is used in particular with respect to device housings for installation in nineteen inch (19 in.) racks or nineteen inch (19 in.) distribution frames. One height unit corresponds to one and three quarter inches ($1\frac{3}{4}$ in.) or forty four point four five millimeters (44.45 mm).

Owing to the fact that two mutually independent mounting rails are used for fastening the carrier unit in the joint distribution frame, generally every fastening position present in the distribution frame can be used flexibly and populated modularly with any desired carrier units. The storage space in the distribution frame or distribution cabinet can be functionally optimally utilized. At the same time, the diversity of configurations in the distribution frame is maximized.

It is preferably possible to dispense with the use of a housing for the carrier units, for example a carrier housing for a tray or for a patch panel, as a result of which construction space is saved and configuration capability gained.

The rail arrangement can optionally also have a plurality of first mounting rails and a plurality of second mounting rails, wherein all of the first mounting rails are arranged on the same side of the distribution frame and all of the second mounting rails on the opposite side of the distribution frame and are therefore spaced apart from the first mounting rails. All of the mounting rails of the rail arrangement are preferably arranged at the same height level in the distribution frame. Insofar as a plurality of first mounting rails are provided, they can be spaced apart from one another or connected to one another along the insertion direction, also mentioned below, or the abovementioned second translation degree of freedom—this also applies correspondingly to the plurality of second mounting rails.

It should be mentioned at this juncture that the rail arrangement, in particular the first mounting rail and the second mounting rail, can be designed to receive more than one carrier unit between them, for example two carrier units arranged next to one another or on one another, three carrier units arranged next to one another and/or on one another, four carrier units arranged next to one another and/or on one another or even more carrier units in an arbitrary arrangement. In this case, the carrier units can be connected in a mechanically rigid or movable manner to one another. Within the scope of the invention, it is important in particular that the first mounting rail and the second mounting rail are formed separately from one another and are mounted or mountable independently of one another in the distribution frame in order to form a slot for at least one carrier unit.

Provision can be made that the first mounting rail and the second mounting rail are arranged at the same height position along the third translation degree of freedom, in particular are arranged at the same height position in the distribution frame. In principle, however, an offset in the height position can also be provided (depending on the configuration of the carrier unit), but this is not preferred.

The rail arrangement can be mounted or mountable in the distribution frame in such a manner that the first mounting rail is fastened to a first vertical strut (also: "vertical rail") and the second mounting rail to a second vertical strut of the distribution frame, said vertical struts preferably being arranged on the same side of the distribution frame (in particular on the front side of the distribution frame).

In the mounted state of the rail arrangement in the distribution frame, the first mounting rail and the second mounting rail are preferably mounted at the same height position of the distribution frame.

In the mounted state of the rail arrangement in the distribution frame, the first mounting rail and the second mounting rail are preferably oriented in such a manner that the insertion direction, also mentioned below (or an extension direction opposed to the insertion direction) or the abovementioned second translation degree of freedom runs at the same height level or height position of the distribution frame. A movement of the carrier unit guided by the rail arrangement can therefore preferably run at the same height position of the distribution frame, i.e. horizontally or parallel to an installation area of the distribution frame.

However, in the mounted state of the rail arrangement, a vertical guide of the carrier unit can also be provided, i.e. in particular a configuration "hanging" in the distribution frame. In this case, provision can be made that the insertion and extension direction or the abovementioned second translation degree of freedom intersects a plurality of height levels or height positions of the distribution frame. The insertion and extension direction therefore runs vertically or orthogonally to the installation area of the distribution frame.

A mixed horizontal and vertical insertion and extension movement, i.e. an oblique guide of the carrier unit with respect to the installation area of the distribution frame, can also be provided.

For easier understanding, the invention is described below essentially with reference to the purely horizontal insertion and extension direction. However, the following variants and developments are also suitable for a hanging or vertical arrangement or for an oblique arrangement, unless this is technically ruled out.

As already mentioned, the rail arrangement can be suitable advantageously for guiding at least one carrier unit movably between the mounting rails, in particular along at least one translation degree of freedom. It is optionally also possible here to provide a multi-dimensional guide, for example along a plurality of translation degrees of freedom. A rotatable or pivotable arrangement of the carrier unit in the rail arrangement, i.e. a guide along at least one rotation degree of freedom, can optionally also be provided. The movable guide of the carrier unit can be advantageous in particular in order to provide particularly convenient accessibility as required for a service engineer.

In a particularly preferred development of the invention, the mounting rails can be designed to receive the carrier unit in such a manner that the carrier unit is guided movably along at least one insertion direction (and preferably an extension direction opposed to the insertion direction, i.e. at least in sections along a translation degree of freedom, for example the abovementioned "second" translation degree of freedom). Preferably, but not necessarily, the guide is undertaken exclusively along the insertion and extension direction.

It is optionally also possible to provide a plurality of insertion directions, for example a first insertion direction and a second insertion direction, preferably a second insertion direction directed counter to the first insertion direction. In the event of a plurality of insertion directions, the access options for the service engineer can be increased further.

The rail arrangement is therefore capable of guiding the carrier unit in the manner of a drawer, which can permit particularly good accessibility to components of the carrier unit in the mounted state of the rail arrangement.

In a development of the invention which is alternative to or supplements the guide of the carrier unit, provision can be made that the mounting rails each have a supporting surface for the carrier unit, on which supporting surface the carrier unit received between the mounting rails is able to be supported.

In the multi-part case of the mounting rails, the profile rail in particular can have the supporting surface. However, the functional component can optionally also form a supporting surface.

The carrier unit can therefore be supported securely and stably on the supporting surfaces of the mounting rails. The opposite mounting rails can therefore in a particularly simple and robust way form a slot or bay for receiving a carrier unit.

In particular, a substantially or complete L-shaped configuration of the mounting rails or profile rails can be provided, for example by means of a sheet metal profile bent in an L-shaped manner.

Optionally, the carrier unit can be connected indirectly or directly to the respective mounting rail in a form-fitting and/or force-fitting manner.

Alternatively or additionally to a supporting surface, any desired technical concepts can be provided for fastening and/or guiding the carrier unit between the two mounting rails. For example, a respective longitudinal groove can be provided in the mounting rail (in particular in the functional component), in which longitudinal groove a portion of the carrier unit is displaceably received. A telescopic extension system can also be provided (for example telescopic capability between profile rail and functional component and/or between functional component and carrier unit).

In particular, however, the supporting surface can serve at the same time as a guide surface for the abovementioned guided movement of the carrier unit. However, within the scope of the invention, movable receiving of the carrier unit between the mounting rails is not absolutely necessary, and therefore the supporting surface can also carry out just a support function or a pure supporting function.

The invention will be described below essentially with reference to a rail arrangement which at the same time provides a guide function and a supporting function for the carrier unit. However, this is not intended to be understood as restrictive.

A mounting option for fitting the carrier unit between the mounting rails can be provided in various ways. In particular, provision can be made that the carrier unit is also fittable into the rail arrangement when the rail arrangement is in its mounted state in the distribution frame. In this case, mounting can take place preferably in or counter to the insertion direction (i.e. from the front side of the mounting rails or from the rear side of the mounting rails) and/or from "the top", i.e. in the direction of the abovementioned supporting surface of the mounting rails.

According to a development of the invention, provision can be made that the overall height of the first mounting rail and of the second mounting rail (in particular including the carrier unit) is in each case smaller than a height unit, preferably does not exceed two thirds ($\frac{2}{3}$) of a height unit, particularly preferably does not exceed one third ($\frac{1}{3}$) of a height unit.

The mounting rails are preferably configured in such a manner that neither the mounting rail itself nor the carrier unit in its state mounted between the mounting rails project in overall height beyond two thirds of a height unit, preferably one third of a height unit. In particular, for this purpose, the respective mounting rail can also have a lower overall height than one third of a height unit.

Provision can also be made that the overall height of the first mounting rail and of the second mounting rail is in each case a multiple of one third of a height unit, i.e. is at least one third ($\frac{1}{3}$) of a height unit, for example is also precisely one height unit or is more than one height unit.

According to a development, provision can be made in particular that the overall height of the first mounting rail and of the second mounting rail in each case does not exceed $(n-1)/n$ of a height unit, with n corresponding to a natural number greater than 1. The overall height of the first mounting rail and of the second mounting rail can therefore be, for example, smaller than or equal to one half ($\frac{1}{2}$) U, two thirds ($\frac{2}{3}$) U, three fourths ($\frac{3}{4}$) U, four fifths ($\frac{4}{5}$) U, etc. Preferably, however, the overall height of the first mounting rail and of the second mounting rail in each case does not exceed $1/n$ of a height unit, with n in turn corresponding to a natural number greater than 1. In this even more preferred variant, the overall height of the first mounting rail and of the second mounting rail can therefore be, for example, smaller than or equal to one half ($\frac{1}{2}$) U, one third ($\frac{1}{3}$) U, one fourth ($\frac{1}{4}$) U, one fifth ($\frac{1}{5}$) U, etc.

Since the two mounting rails are not connected to one another and optionally in each case also have only one single fastening point to the distribution frame, it can optionally (but not necessarily) be advantageous to increase the mechanical rigidity of the rail arrangement.

In a development of the invention, provision can therefore be made that the first mounting rail and the second mounting rail each have means for increasing the mechanical rigidity.

An increase in the mechanical rigidity can be achieved, for example, by targeted folded-over edges, material reinforcements, strutting or other known strengthening measures for the mounting rail, in particular in the profile rails of a multi-part mounting rail. The use of a material assembly of at least two basic materials can also be provided, for example a metal/plastic combination or a combination of various metals or plastics in the same mounting rail.

In this way, it is possible to configure the mounting rails, for example, as thin sheet metal parts and to stiffen them subsequently, which can reduce the material costs for the production of the mounting rails.

According to a development of the invention, provision can also be made in particular that the rail arrangement has at least one connecting device in order to mechanically connect the first mounting rail or the second mounting rail to at least one adjacent further mounting rail of a further rail arrangement (thus, in the case of a stacked arrangement, with a further mounting rail located above and/or below, i.e. at an adjacent height position).

In particular, provision can be made that in each case at least one connecting device is provided per mounting rail (i.e. stiffening on both sides of the rail arrangement), preferably with in each case a plurality of connecting devices distributed along the longitudinal axis of the respective mounting rail.

A connecting device can be designed to connect in each case precisely two mounting rails which are directly adjacent to one another and are preferably located at different height positions. However, it is optionally also possible for a plurality of mounting rails to be connected to one another by a single connecting device, for example by the connecting device being arranged running laterally along the mounting rails and providing respective fastening options for the individual mounting rails (such as receiving slots, bores for a screw connection, pins, etc.).

The fastening options or components of the connecting device, in particular the connecting means also mentioned below, can be connected to horizontal and/or vertical portions of the mounting rails.

In particular if a plurality of carrier units are intended to be arranged in the respective rail arrangements directly one above another in the manner of a stack (a stack of carrier units is also known as a "register"), mechanical stabilization of the stack may prove advantageous. In particular, direct mechanical connection of mutually adjacent rail arrangements via the abovementioned connecting devices is suitable for this purpose. All of the rail arrangements involved can thereby be mechanically stiffened.

Preferably, a plurality of connecting devices distributed along the longitudinal axis of the respective mounting rails (or along the second translation degree of freedom) are provided, for example two connecting devices, three connecting devices, four connecting devices, five connecting devices or even more connecting devices. The mechanical connection between the mounting rails can thereby be reinforced further.

Provision can also be made that the connecting device has one or more predetermined breaking points such that the connection between the mounting rails connected by the connecting device can be separated as required by a service engineer. It is therefore possible, in the delivery state, to provide mounting rails which are connected to one another or are stacked over a plurality of height positions and which can then be separated as required.

The connecting device can preferably have a plurality of components, such as metal sheets, plastics carriers, fastening means (e.g. screws or bolts), connecting recesses, connecting members, in particular at least one of the connecting means also mentioned below. The connecting device can in particular have recesses in the mounting rail and at least one separate connecting means, in particular a connecting member, such as a screw, a pin or a bolt.

The connecting device or components of the connecting device can be formed directly in the respective mounting rail (for example, the mounting rail can have the connecting recesses already mentioned). In the case of a multi-part mounting rail, the connecting recess can be formed in the profile rail and/or in the functional component.

The functional component and the profile rail can jointly provide the guide for the carrier unit, and therefore advantageous or required components for the guide can be arranged on the functional component and/or the profile rail. In particular, however, provision can be made that the functional component, the movement limiting means, also mentioned below, components of the fixing arrangement, also mentioned below, components of the linear guide pair, also mentioned below, and/or other features which are described above and below in respect of the mounting rails or profile rails.

It should be mentioned at this juncture that the rail arrangement does not necessarily have to have a connecting device to adjacent rail arrangements. For example, even a combination of profile rail and functional component can have a sufficiently mechanically stabilizing effect optionally without the connection to further stabilizing or reinforcing measures. However, mounting rails which are in particular arranged one above another are preferably fixed with respect to one another.

In a development, provision can be made in particular that the connecting device has at least one connecting means fastenable directly to the adjacent mounting rails to be connected, wherein the connecting means is preferably screwable, latchable and/or pressable to the respective mounting rails.

The connecting means is preferably designed as a connecting member or has a connecting member which can be fixedly connected mechanically to the respective mounting rail, but can preferably be formed separately. The connecting member can be mountable with at least a first portion (in particular an end portion) in a connecting recess of a mounting rail and at the same time can be fastenable (in particular latchable, screwable or pressable) in a further connecting recess of an adjacent mounting rail of a further rail arrangement. On its first portion or end portion, the connecting member can preferably have one or more elastic latching means, threaded elements and/or an abutment shoulder.

The connecting member can optionally be designed on a second end portion to receive therein the first end portion of a connecting member of an adjacent rail arrangement, in order to save on construction space. The connecting member can therefore be of hollow design, in particular hollow-cylindrical design, in particular on its second end portion.

In addition, the connecting device can optionally have a bottom-side connecting recess which is arranged below the top-side connecting device in the same mounting rail.

The top-side connecting recess and the bottom-side connecting recess are preferably arranged in alignment with each other. In particular in the multi-part case of the mounting rail, provision can be made that the top-side connecting recess is formed in the functional component and the bottom-side connecting recess in the profile rail. In particular in the single-part case of the mounting rail, even a single connecting recess may optionally also be sufficient in order to connect the mounting rail to the mounting rail arranged above it or below it via a separate connecting member or connecting member connected to the mounting rail (single-part or multi-part).

The top-side and/or bottom-side connecting recess can be designed, for example, as an elongate hole, through bore or other recess in the mounting rail.

The connecting recess preferably tapers along a spatial direction and/or has a change in diameter in order to permit form-fitting fixing of the connecting member. For example, the connecting recess can be designed as an elongate hole/ bore combination (keyhole shape) such that, for example, a connecting member introduced into the bore is fixable in a form-fitting manner by displacement along the longitudinal axis of the mounting rail (for this purpose, the connecting member can have a change in diameter, for example a shoulder or another abutment surface).

The connecting member can be, for example, a screw or a bolt. However, the connecting member is preferably designed as an expanding head and has a bolt which is designed so as to be elastically expandable on at least one end portion in order to latch in a suitable connecting recess of the adjacent rail arrangement.

Provision can also be made that the connecting means of the connecting device is plate-like or rail-shaped, for example in the form of a flat plastics component or metal sheet which is fastenable to the side surfaces of the mounting rails to be connected. The plate-like or rail-shaped connecting means can therefore laterally connect two or more mounting rails to one another. For this purpose, the plate-like or rail-shaped connecting means and/or the mounting rails can have respective bores in order to permit a screw connection, latching connection or plug-in connection, with other fastening options preferably also being able to be provided.

In addition, provision can also be made that the connecting means have lateral cutouts (e.g. grooves) and/or lateral webs or ribs into which the mounting rails to be connected to one another can be fitted. The mounting rails can be, for example, latched, pressed or screwed in the cutouts or on the webs or ribs.

In a development of the invention, provision can be made that the first mounting rail and/or the second mounting rail have/has a rear-side movement limiting means in order to limit the movement of the carrier unit at least in an insertion direction.

It can therefore be avoided that the carrier unit is unintentionally pushed on the rear side into the distribution frame or out of the rail arrangement.

Alternatively or additionally, provision can also be made that the first mounting rail and/or the second mounting rail have/has a front-side movement limiting means in order to limit the movement of the carrier unit at least counter to the insertion direction such that the carrier unit cannot be unintentionally completely pushed forward out of the distribution frame or out of the rail arrangement.

The front-side or rear-side movement limiting means can optionally be releasable or unlockable as required without being destroyed, for example by actuation of the latching lever also explained below.

As already mentioned, the movement limiting means can preferably be formed in the functional component of a multi-part mounting rail (e.g. as an elastic plastics lug). However, the movement limiting means can also be formed in a single part with the profile rail or a single-part mounting rail, for example as a formed sheet metal portion.

Preferably, the movement limiting means is formed elastically at least in portions in or counter to the insertion direction and, for example, has a spring, in particular a leaf spring. In addition to limiting the insertion depth, i.e. in addition to a fixing or stopper function, the movement limiting means can therefore at least assist the pushing of the carrier unit out of the rail arrangement in the extension direction (i.e. counter to the insertion direction), for example can press the carrier unit forward as soon as unlocking, for example unlocking of a latching lever of the fixing arrangement also mentioned below, is actuated by the service engineer.

In a development of the invention, provision can be made that the movement limiting means is designed to limit the movement of the carrier unit exclusively along the insertion direction or counter to the insertion direction and to allow it to pass in the opposite direction. By this means, a mounting option for the carrier unit can be provided starting from the end of the mounting rail having the movement limiting means.

This can preferably take place by the movement limiting means being bent over by the carrier unit temporarily and without being destroyed.

Thus, for example, alternatively or additionally to the insertion option from the front, the carrier unit can also be inserted from the rear side into the slot or between the two mounting rails. In particular, the abovementioned leaf spring can be configured in such a manner that it bends over temporarily and without being destroyed in the direction which is not to be limited, in order to enable the carrier unit to slide past. If the carrier unit is pushed somewhat beyond the front plane of the distribution frame, the movement limiting means is able to finally resume its initial position.

In a development of the invention, provision can be made that the fastening point of the first mounting rail and/or of the second mounting rail is arranged on an end portion of the respective mounting rail. The end portion can be provided in particular on a front end of the mounting rail in the extension direction.

In particular, provision can be made that the end portion having the fastening point runs transversely or orthogonally to the insertion/extension direction of the carrier unit, for example in the form of a tab or lug. However, the fastening point can also be formed, for example, on a side surface of the mounting rail.

In principle, the fastening point can be provided on any desired portion of the mounting rail, i.e. also on a central portion (optionally in turn as a tab or lug).

The mounting rail can consequently be positioned with its fastening point, in particular a recess, at the designated fastening position or height position of the distribution frame and fastened to the distribution frame via a fastening means (e.g. a screw, a bolt or a spring clip). The fastening means can be formed in a single piece with the mounting rail or the distribution frame, but is preferably a separate component.

For example, the fastening point of the mounting rail can be designed as a bore, preferably as an oversized bore or as an elongate hole, particularly preferably as an elongate hole running obliquely (for example obliquely between the abovementioned second and third translation degree of freedom).

It can be ensured by an elongate hole or an oversized bore that there is no undesirable height offset between the two mounting rails which are independent of one another, and mounting tolerances in the fastening in the distribution frame and tolerances of the distribution frame and of the mounting rails can be compensated for. By means of an obliquely running elongate hole or an oversized bore, vertical and also horizontal corrections in the positioning can advantageously be undertaken.

The fastening point can also be designed as a protrusion, for example pin, web or threaded pin, in order to fasten the mounting rail directly in a recess of the distribution frame. Provision can also be made that the fastening point has a snap-fit connection.

It is also possible for a plurality of fastening points to be provided per mounting rail, for example two, three, four or even more fastening points. As a rule, however, just a single fastening point is sufficient. The use of a single fastening point can also lead to a particularly compact rail arrangement.

In an advantageous development of the invention, provision can be made that the first mounting rail and the second mounting rail have the same structural and/or functional design. However, the mounting rails are preferably formed mirror-symmetrically with respect to one another.

In particular, the functional components of a multi-part mounting rail preferably have the same structural and/or functional design and are formed mirror-symmetrically.

The invention also relates to a carrier arrangement, having a carrier unit, in particular a patch panel or a tray, and a rail arrangement for the carrier unit according to one of the above and below embodiments, wherein the carrier unit is received between the two mounting rails (is preferably connected directly to the two mounting rails).

Preferably, but not necessarily, the carrier unit is received between the mounting rails in such a manner that the carrier unit is movable along at least one translation degree of freedom, in particular along the insertion and extension direction already mentioned above.

The use of separate mounting rails in the proposed carrier arrangement makes it possible to provide very good accessibility to the carrier units or into the interior of the distribution frame because of the preferably housing-less carrier units. At the same time, a particularly modular combination of various types and height variants of carrier units is possible.

In the case of the known carrier housings with high port densities, there are sometimes problems with making individual connectors accessible in the fully occupied state. In particular if adjacent ports are located in the running mode, there is the risk of malfunctions of the data connection. The possibility of removing and/or pulling out individual carrier units from the stack in the direction of the service engineer (for example lifting them off from the supporting surfaces of the mounting rails) increases the accessibility of individual ports and reduces this risk. In this way, even access to the rear ports on the carrier unit can be made possible. A rigid screw connection of individual carrier housings can be avoided, and access to the carrier units is not blocked by the closed carrier housing. The assembly time can thereby be decisively reduced and the ease of maintenance increased.

Finally, the open design of the two-part rail arrangement (i.e. by means of the two separate mounting rails) affords the option of using high-fiber distribution channels, or trunks, for distributing a multiplicity of lines between different height levels of the distribution frame more advantageously since the connecting portions, or trunk legs, of the distribution channels can be connected over and beyond a plurality of height levels to the individual carrier units in a simple manner.

In an advantageous development of the invention, provision can be made that a linear guide pair is formed between at least one of the two mounting rails and a side surface of the carrier unit. The linear guide pair can be formed in particular between at least one functional component of a multi-part mounting rail and the assigned side surface of the carrier unit. Alternatively, however, the linear guide pair can also be formed directly between the respective profile rail of the mounting rail and the side surface of the carrier unit.

The linear guide pair can preferably provide a linear guide in the insertion and extension direction, but optionally also orthogonally thereto, in particular in the vertical direction or along the third translation degree of freedom. A linear guide in the vertical direction can advantageously assist inserting the carrier unit into the rail arrangement.

For example, a first connecting partner of the linear guide pair can be designed as a guide groove and a second connecting partner of the linear guide pair as a corresponding sliding block. Thus, for example, a T groove connection or a dovetail connection can be realized.

The linear guide pair is able to provide security against loss because of an additional form fit between mounting rail and carrier unit and also to mechanically stabilize the guide.

In an advantageous development of the invention, provision can be made that a fixing arrangement is formed between at least one of the two mounting rails and a side surface of the carrier unit in order to fix, preferably in each case to releasably fix, the carrier unit along or counter to the insertion direction in at least one pulled-out position and/or in an operating position (the operating position is preferably a completely closed position). The fixing arrangement can be formed in particular between at least one functional component of a multi-part mounting rail and the assigned side surface of the carrier unit.

The mounting rail (in particular the functional component) can have, for example, a first fixing unit and the side surface of the carrier unit can have a second fixing unit in order to form the fixing arrangement. A defined movement limit can thereby be made possible. The pulled-out position or operating position of the carrier unit can be fixed in such a manner that it cannot be overcome by the service engineer or can be overcome (without being destroyed) if a defined force is applied.

According to a refinement of the invention, provision can be made that the fixing arrangement is designed to fix the carrier unit in a partially pulled-out position (partial extension) and/or in a fully pulled-out position (full extension) along the second translation degree of freedom. Provision can be made that, in the event of full extension, a rear interface of the carrier unit, in particular of a patch panel, is at least partially accessible to the service engineer and is still concealed or inaccessible in the event of the partial extension.

In the intermediate position, the fiber-optic modules or other constituents of the carrier unit can preferably be comfortably exchanged or at least inspected.

Tilting or pivoting of the carrier unit or of part of the carrier unit can also be provided (in the partially extended and/or fully extended state). For this purpose, the carrier unit can have a joint connection, in particular a hinge.

Mechanical fixing is preferably provided, at least in a fully pulled-out position, to ensure that the carrier unit is not unintentionally completely removed from the rail arrangement or from the distribution frame or can fall out therefrom. However, fixing in a partially pulled-out position can also be advantageous in order to ensure sufficient accessibility to the carrier unit for most applications, to stabilize the maintenance position and to show the service engineer that a further extension is not required where possible. In principle, any desired number of discrete pulled-out positions can be provided, i.e. in particular also a plurality of partially pulled-out positions.

In an advantageous refinement of the invention, provision can be made that the fixing arrangement has a latching lever which is spring-elastic at least in sections and a latching recess or an offset for the latching lever in order to provide a releasable fixing of the pulled-out position or of the operating position of the carrier unit between the two mounting rails.

The first fixing unit can therefore be designed, for example, as a latching lever and the second fixing unit as a latching recess or offset for the latching lever. A releasable fixing of the pulled-out position is in principle preferred. The service engineer can therefore consciously bring the carrier unit into the correspondingly desired pulled-out position and, in the case of doubt, can move it further by application of a defined, further increased tensile or compressive force in or counter to the extension direction of the carrier unit and/or can unlock or lock the position of the carrier unit by actuation of the latching lever.

Alternatively or additionally to a mechanical latching connection, in principle any desired force-fitting or form-fitting fixing mechanisms can be provided, for example even magnetic fixing. For example, a plurality of magnetic latching points can be distributed along the longitudinal axis of the mounting rail (e.g. by distribution of permanent magnets along the functional component) which correspondingly interact with one or more magnetic mating latching points on the assigned side surface of the carrier unit.

The invention also relates to a rail assembly, having a plurality of rail arrangements according to the above and following embodiments.

The rail arrangements of the rail assembly are preferably arranged in the manner of a stack and are particularly preferably connected mechanically to one another, for example by means of the connecting devices described above and below.

The invention also relates to a fiber-optic distribution system, having a distribution frame and one or more carrier arrangements according to the above and following embodiments. Insofar as a plurality of carrier arrangements are provided within the distribution frame, they are fastened preferably at different height positions in the distribution frame and/or are arranged in a hanging arrangement in the distribution frame.

Provision can be made to mount two, three, four, five, six, seven, eight, nine, ten, twenty, thirty, forty, fifty or even more carrier arrangements in different height positions, preferably directly one above another, in a common distribution frame. In particular, such a stack of a plurality of carrier arrangements, or registers, or the rail assembly can be successively constructed. The distribution frame can be populated as desired with carrier units, in particular patch panels or carrier arrangements.

The small overall height of the mounting rails or carrier arrangements makes it possible to produce a very fine height division, with individual carrier units being able to act as a covering for other carrier units in order, in the non-extended state, to limit the access to the fiber-optic infrastructure to the most necessary, and to prevent dust and soiling.

Optionally, a separate cover or a separate covering (e.g. a metal sheet) or a dummy carrier unit or a dummy patch panel can be provided for the uppermost carrier unit or the uppermost carrier arrangement of the stack/the rail assembly. In principle, a cover or a separate covering, in particular a metal plate, can be provided for any desired carrier unit of the stack, i.e. not necessarily only for the uppermost carrier unit.

In an advantageous manner, standardized carrier units of differing functionality (for example module carriers, cable management systems, storage solutions or labeling panels) can be combined with one another as desired in the overall assembly in a common distribution frame and, even after assembly in the distribution frame, can be exchanged and modified independently of one another. In this way, customer enquiries can be dealt with extremely specifically without having to produce an individual product for the particular application.

Preferably, neither the rail arrangement, the carrier arrangement, the distribution frame nor the fiber-optic distribution system have a carrier housing. A patch panel without a carrier housing is sometimes also referred to as a tray.

The invention additionally also relates to a distribution frame, having at least one rail arrangement according to the above and following embodiments. Insofar as a plurality of rail arrangements are provided, they are preferably fastened at different height positions in the distribution frame.

Owing to the only very low component height of the rail arrangements, it is possible in the proposed manner to utilize standard heights of one third ($\frac{1}{3}$) U, which optimizes the usable construction space in the distribution frame. This is not possible in the case of the carrier housings used in the prior art since the latter, as the smallest height variants, necessarily have to use one height unit or an integer multiple of a height unit.

The invention also relates to the use of a rail arrangement which has a first mounting rail and a separate second mounting rail in a distribution frame for movably guiding a carrier unit.

Features that have been described in conjunction with one of the subjects of the invention, specifically given by the rail arrangement according to the invention, the carrier arrangement according to the invention, the rail assembly according to the invention, the fiber-optic distribution system according to the invention, the distribution frame according to the invention and the use according to the invention, can also be advantageously implemented for the other subjects of the invention. Similarly, advantages that have been mentioned in conjunction with one of the subjects of the invention can also be understood as relating to the other subjects of the invention.

In addition, it is noted that expressions such as "comprising", "having" or "with" do not exclude any other features or steps. Furthermore, expressions such as "a", "an" or "the" which refer to a single number of steps or features do not exclude a plurality of features or steps, and vice versa.

In a puristic embodiment of the invention, however, it may also be provided that the features introduced in the invention by the expressions "comprising", "having" or "with" constitute an exhaustive list. Accordingly, within the context of the invention, one or more lists of features may be considered as self-contained, for example respectively for each claim. The invention can for example consist exclusively of the features specified in Claim 1.

It should be mentioned that designations such as "first" or "second", etc. are used mainly for the purposes of being able to make a distinction between respective device or method features and are not necessarily intended to indicate that features require one another or are related to one another.

It should also be emphasized that the values and parameters described in the present document include deviations or fluctuations of ±ten percent (10%) or less, preferably five percent (5%) or less, furthermore preferably ±one percent (1%) or less, and very particularly preferably ±zero point one percent (0.1%) or less in the respectively mentioned value or parameter, provided that these deviations are not ruled out when implementing the invention in practice. The specification of ranges by way of start and end values also comprises all those values and fractions that are included by the respectively mentioned range, in particular the start and end values and a respective mean value.

It should be mentioned at this juncture that the specific combinations of features mentioned in the dependent claims can also constitute independent inventions in themselves within the scope of the claimed overall concept according to the invention. The applicant explicitly reserves the right to claim features of the dependent patent claims also independently of the independent patent claims, in particular for any desired mounting rails for a carrier unit, i.e. in particular also for a first mounting rail and a second mounting rail which are mechanically connected to one another and are not necessarily formed separately, for example also in combination with a carrier housing. The further claims, claim features and the features disclosed in the description in its entirety and the drawing relate to advantageous embodiments and variants of the abovementioned independent inventions.

Exemplary embodiments of the invention will be described in more detail below with reference to the drawings.

The figures each show preferred exemplary embodiments in which individual features of the present invention are illustrated in combination with one another. Features of one exemplary embodiment may also be implemented separately from the other features of the same exemplary embodiment, and may accordingly be readily combined by a person skilled in the art to form further useful combinations and sub-combinations with features of other exemplary embodiments.

In the figures, elements of identical function are denoted by the same reference signs.

US 12,681,253 B2

17

Figure 13:
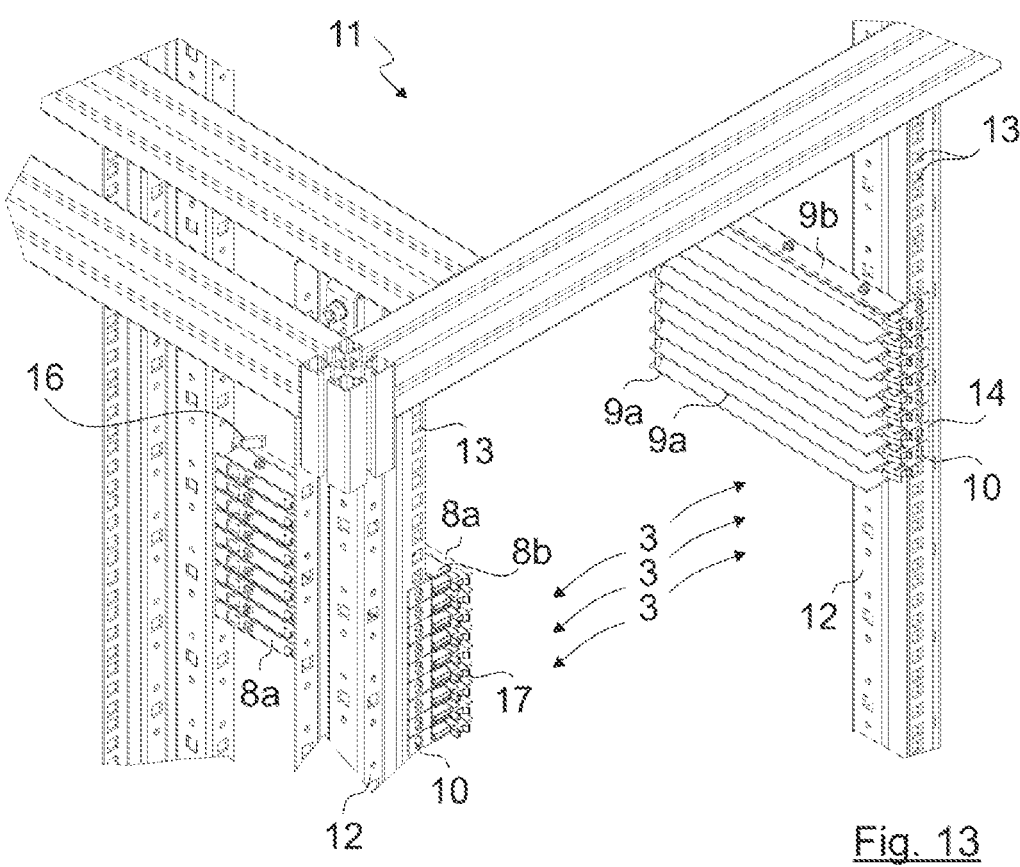
Figure 14:
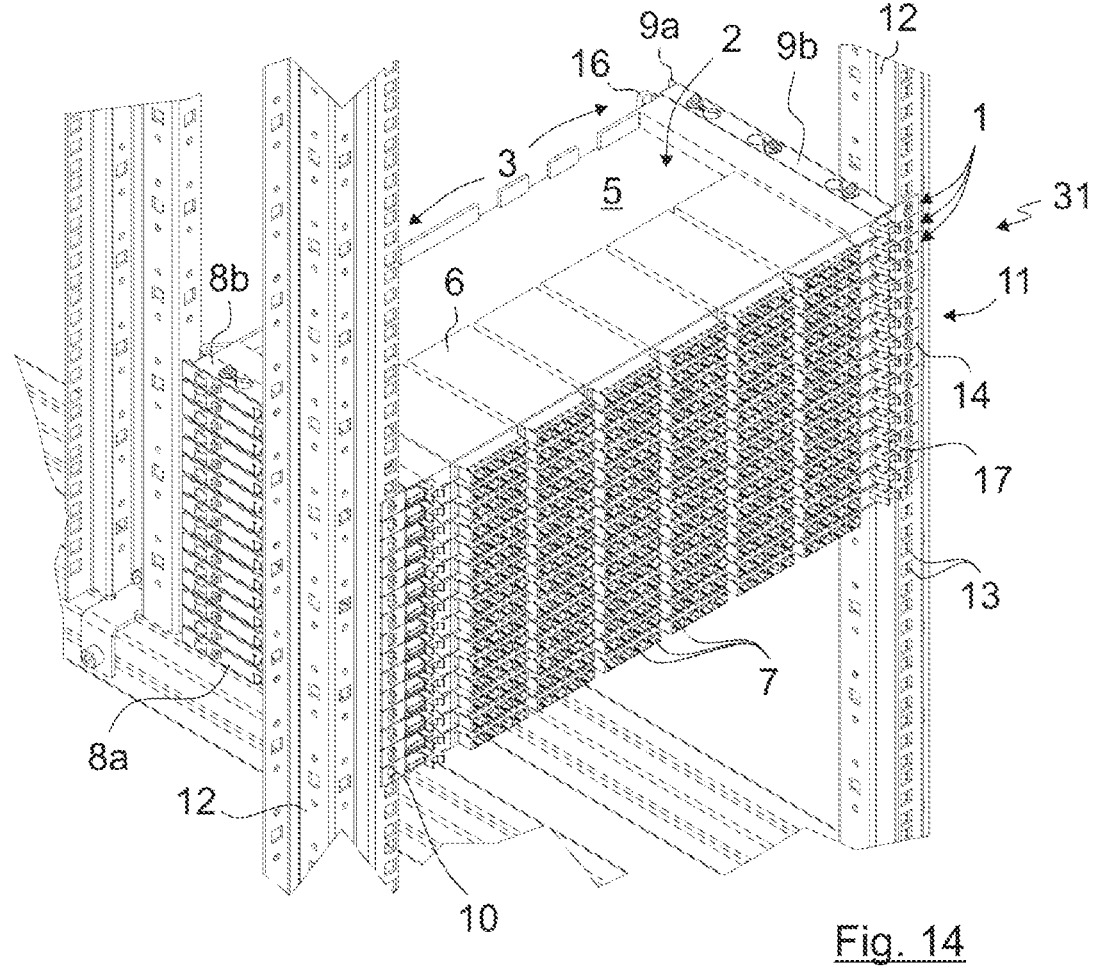

FIG. 13 shows a distribution frame according to an exemplary embodiment with a plurality of rail arrangements arranged at different height positions; and FIG. 14 shows a fiber-optic distribution system according to an exemplary embodiment, having a distribution frame and a plurality of carrier arrangements arranged at different height positions.

DETAILED DESCRIPTION

Figure 1:
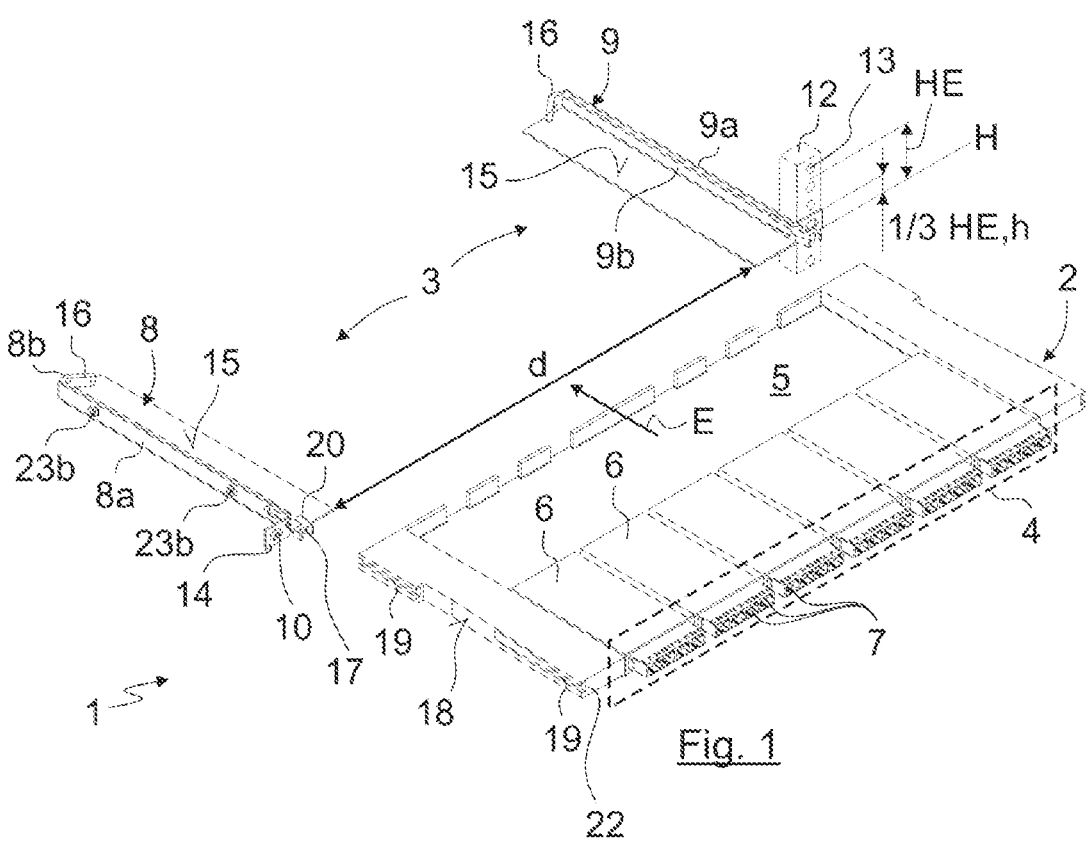
FIG. 1 shows a carrier arrangement with a rail arrangement and a patch panel according to a first exemplary embodiment, in an extended state of the patch panel.
Figure 2:
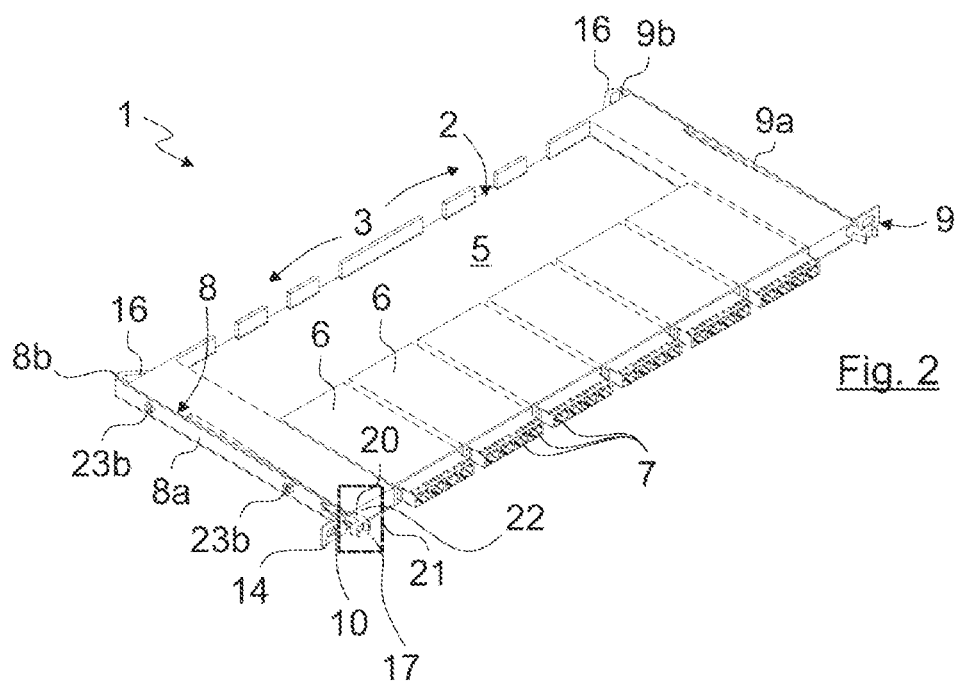
FIG. 2 shows the carrier arrangement of FIG. 1 in an inserted state of the patch panel.

FIGS. 1 and 2 show a carrier arrangement 1 according to a first exemplary embodiment of the invention with a carrier unit 2 and a rail arrangement 3 for the carrier unit 2, wherein the carrier unit 2 is illustrated in FIG. 1 in a completely pulled-out state and in FIG. 2 in a completely inserted state. In the exemplary embodiments, the carrier units are each designed as patch panels 2, but this should not be understood as restrictive. The rail arrangement 3 can be suitable in principle for use with any desired carrier units, in particular also for use with trays or dummy elements.

The patch panel 2 has a front interface or connection panel 4 and a rear interface 5. A plurality of cassettes 6 which can each have optical and/or optical-electrical plug-in connectors 7 are arranged in the region of the front connection panel 4. Patch panels 2 are known in principle and are available in many different variants, and therefore more specific details will not be discussed here.

The rail arrangement 3 has a first mounting rail 8 and a separate second mounting rail 9. The two mounting rails 8, 9 are spaced apart from one another (compare distance d in FIG. 1 along a first translation degree of freedom) and are designed to receive the patch panel 2 jointly between them.

In the exemplary embodiments, the rail arrangement 3 is designed to guide the patch panel 2 movably along and counter to an insertion direction E (or along a second translation degree of freedom orthogonally to the first translation degree of freedom).

In the exemplary embodiments, the first mounting rail 8 and the second mounting rail 9 each have the same structural design, but are formed and arranged mirror-symmetrically with respect to one another.

Each of the mounting rails 8, 9 has at least one fastening point 10 for fastening to a distribution frame 11 (compare FIGS. 13 and 14). In FIG. 1, by way of example, an individual vertical strut 12 of the distribution frame 11 with respective fastening positions 13 is indicated by dashed lines. The fastening points 10 are each arranged on a bent-over, lateral portion 14 (a lug) of the respective mounting rail 8, 9 and are designed as elongate bores in order to create a compensation option for tolerances. The fastening points 10 or elongate bores can be finally arranged in alignment with the desired fastening positions 13 of the distribution frame 11 or of the corresponding vertical strut 12 of the distribution frame 11, and therefore the first mounting rail 8 and the second mounting rail 9 are preferably arranged at the same height position H in the distribution frame.

As a rule, the height positions H or fastening points 10 of the distribution frame 11 are arranged in a defined grid and are each spaced apart from one another by a third of a height unit U. The overall height h (with respect to a third translation degree of freedom orthogonal to the first two translation degrees of freedom) of the first mounting rail 8 and of the second mounting rail 9 or the entire carrier arrangement 1 is preferably selected in such a manner that it does not exceed one third of a height unit U, and therefore as compact a stack, or register, as possible of a plurality of carrier

Figure 7:
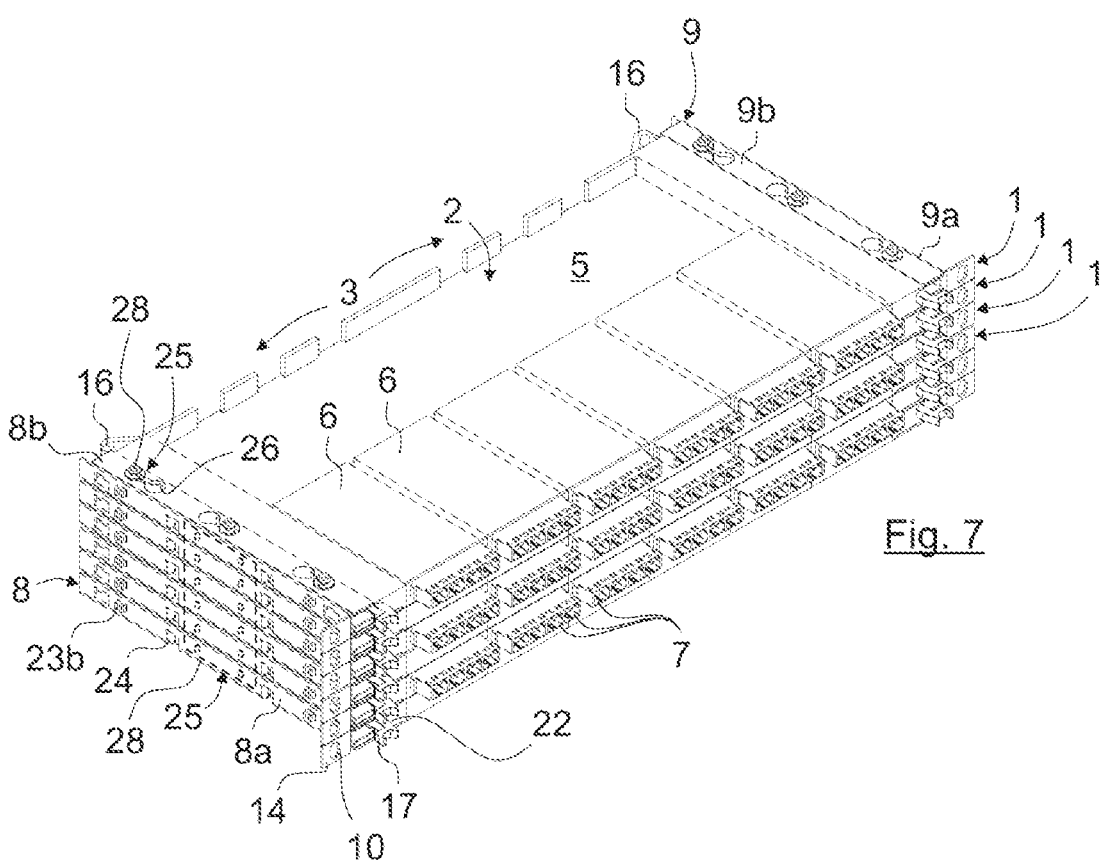
FIG. 7 shows a stack of a plurality of carrier arrangements which are connected to one another via respective connecting devices according to FIGS. 5 and 6.

18 arrangements 1 can be arranged in the common distribution frame 11. Corresponding stacks of carrier arrangements 1 that are also referred to within the scope of the invention as "rail assemblies" are illustrated by way of example in FIGS. 7 and 14. In particular, a carrier housing for the patch panel 2 or the patch panels 2 can be dispensed with, as a result of which a greater patch panel density can be achieved in the distribution frame 11. According to the prior art, fastening or spacing can be realized as a rule only in integer multiples of a height unit U.

It should be mentioned at this juncture that also, depending on the application, a plurality of insertion directions E can be provided for a carrier unit or a patch panel 2, in particular a first insertion direction and a second insertion direction opposed to the first insertion direction (for example if, in the mounted state of the rail arrangement 3 in the distribution frame 11, an access option for the service engineer from opposite sides, i.e., for example, from the front and rear, is intended to be ensured in order to enable the service engineer to push out and insert the carrier unit or the patch panel 2 from both sides of the distribution frame 11). However, for simpler understanding, the invention will be described here essentially with precisely one insertion direction, as also illustrated in FIG. 1, but this should not be understood as restrictive.

In all of the exemplary embodiments, the mounting rails 8, 9 are of multi-part design, but this in principle should not be understood as restrictive. In the exemplary embodiments, each of the mounting rails 8, 9 has a profile rail 8a, 9a (preferably a primarily L-shaped profile rail 8a, 9a) manufactured from sheet metal) and a functional component 8b, 9b fastened mechanically rigidly and directly to the profile rail 8a, 9a. The profile rail 8a, 9a forms a supporting surface 15 for the patch panel 2, said supporting surface running along the second translation degree of freedom y.

Figures 3, 4:
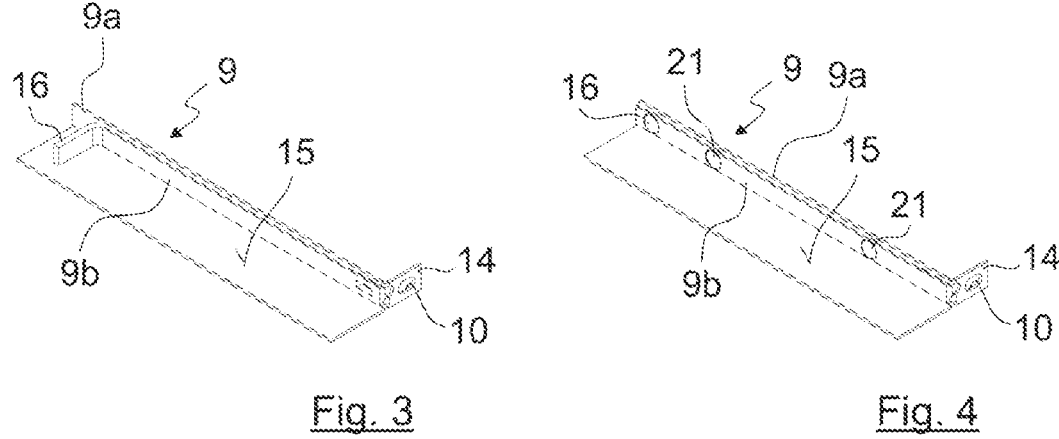
FIG. 3 shows a variant according to the invention of a mounting rail of a rail arrangement with a substantially rigid movement limiting means.
FIG. 4 shows a further variant according to the invention of a mounting rail for a carrier arrangement with a magnetic fixing arrangement.
Figure 5:
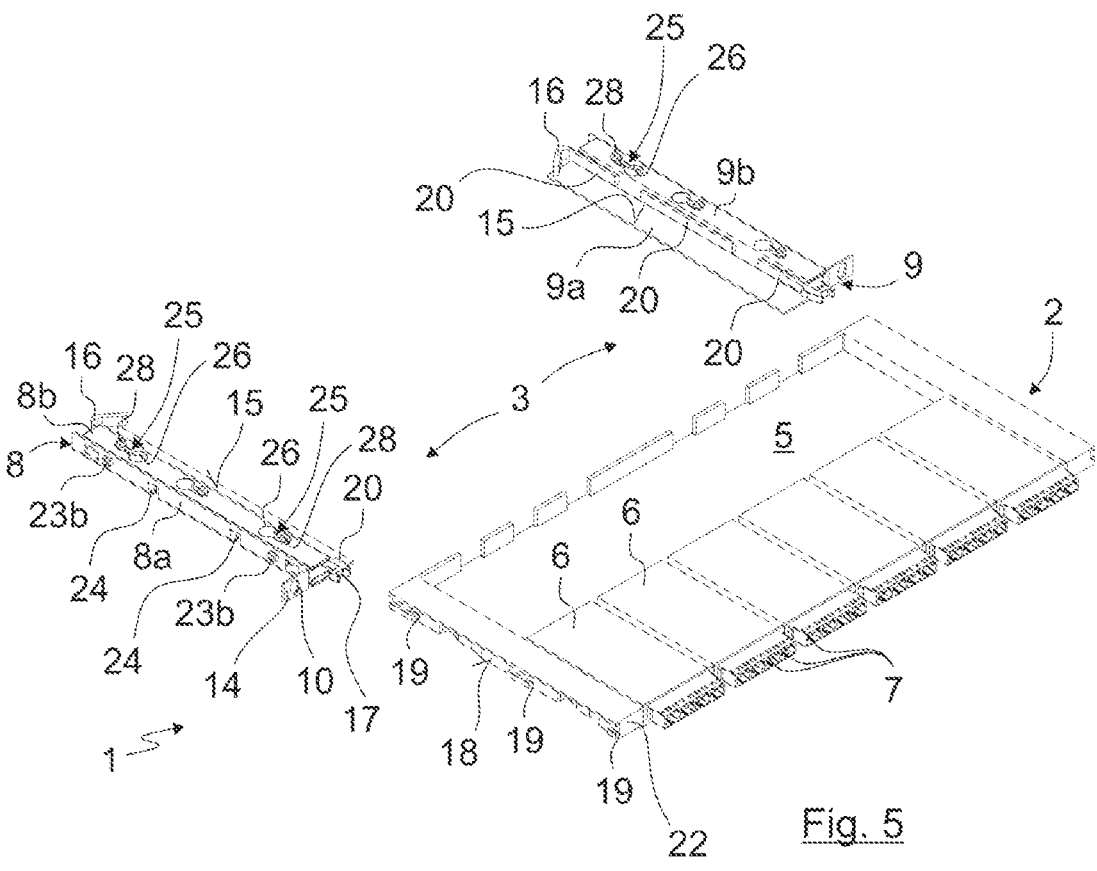
FIG. 5 shows a carrier arrangement with a rail arrangement and a patch panel according to a second exemplary embodiment, in an extended state of the patch panel.
Figure 6:
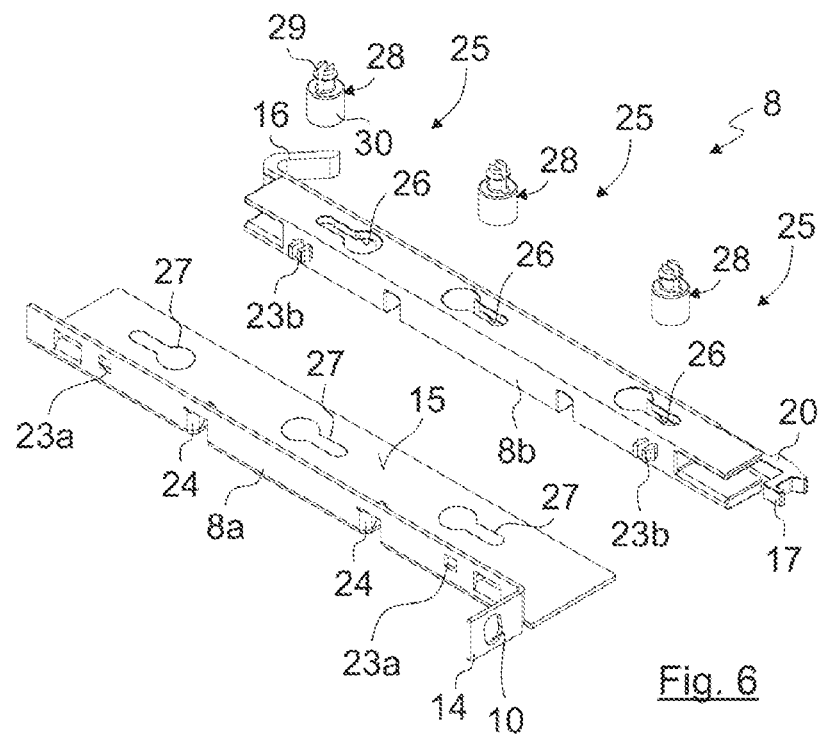
FIG. 6 shows a detailed view of a two-part mounting rail with a connecting device for connection to a further mounting rail (not illustrated) of a further rail arrangement.

In the exemplary embodiment of FIGS. 1 and 2, the mounting rails 8, 9 each have a rear-side movement limiting means 16 in order to limit the movement of the patch panel 2 along the insertion direction E. The exemplary embodiment illustrated in FIGS. 1 and 2 involves elastic movement limiting means 16, as a result of which the service engineer is additionally assisted in pushing the patch panel 2 out of the rail arrangement 3. Alternatively to an elastic movement limiting means 16, however, a rigid movement limiting means 16 can also be provided, as illustrated in FIG. 3, or a magnetic movement limiting means 16 (compare FIG. 4). In the exemplary embodiments, the movement limiting means 16 is in each case formed on the functional component 8b, 9b.

Figure 11:
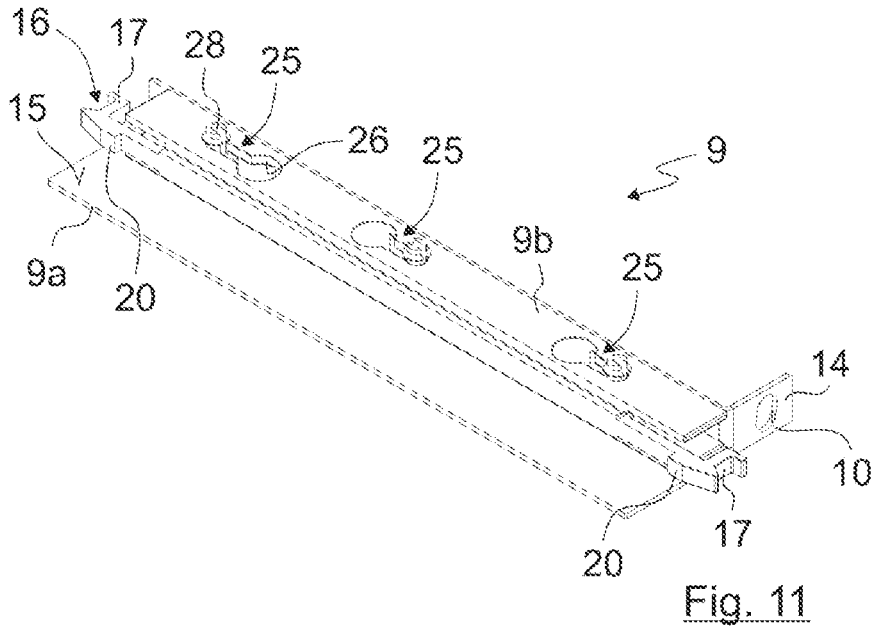
FIG. 11 shows a further variant according to the invention of a mounting rail for a carrier arrangement with a releasable or latchable movement limiting means.

It is also intended to be clarified with reference to FIG. 11 that a movement limiting means 16 which cannot be overcome is not necessarily required in the context of the invention. In principle, a movement limiting means 16 which can be overcome can also be provided to provide the option of pulling the patch panel 2 on the rear side out of the rail arrangement 3 if a certain force component is overcome or a corresponding latching lever 17 is unlocked. The accessibility and mountability for the service engineer can thus be further simplified.

In order to further improve the guiding of the patch panel 2 along the rail arrangement 3, a linear guide pair can be formed between at least one of the two mounting rails 8, 9 and a side surface 18 of the patch panel 2, with a first connecting partner 19 of the linear guide pair being designed as a guide groove and a second connecting partner 20 of the linear guide pair as a corresponding sliding block. In the exemplary embodiments, the sliding block or the second connecting partner 20 is in each case formed on the functional component 8b, 9b.

Figure 9:
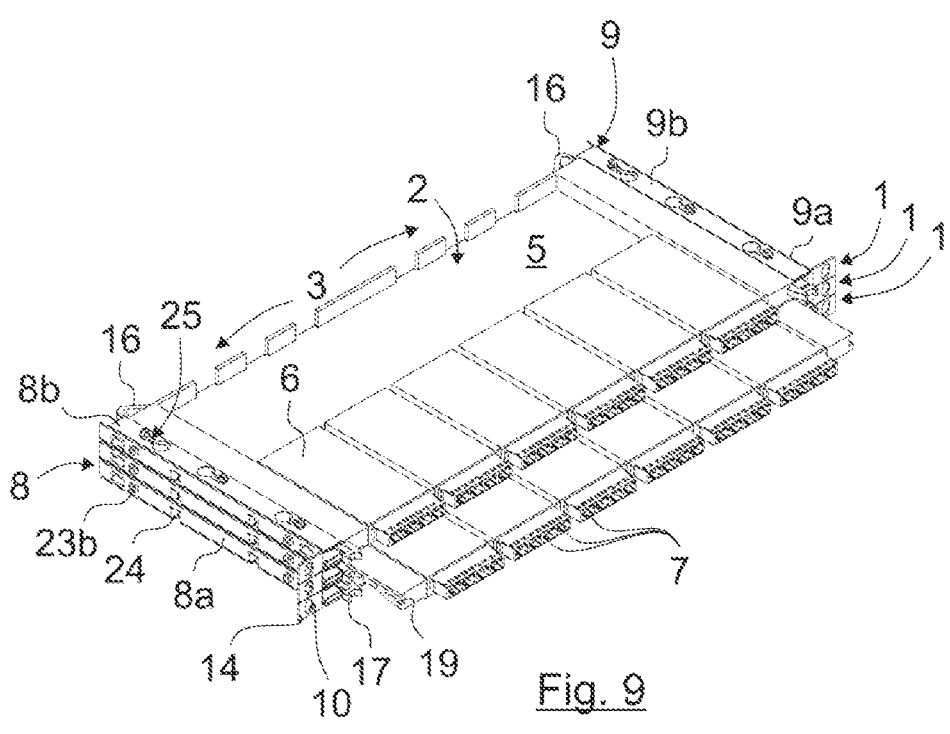
FIG. 9 shows the carrier arrangement of FIG. 5 in a partially extended position of the patch panel.
Figure 10:
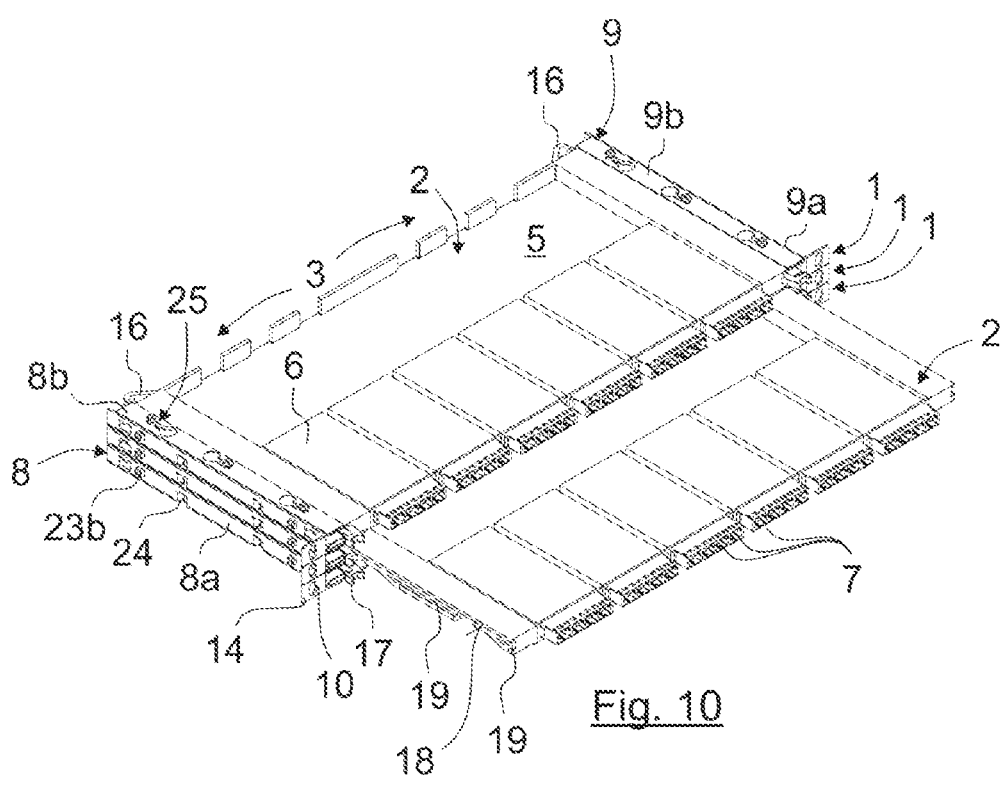
FIG. 10 shows the carrier arrangement of FIG. 5 in a fully pulled-out position of the patch panel.

Also, in addition to the movement limiting means 16 already described, a fixing arrangement 21 can be formed between at least one of the two mounting rails 8, 9 and a side surface 18 of the patch panel 2 in order to fix the patch panel 2 in at least one pulled-out position along or counter to the insertion direction E. For example, fixing in a partially pulled-out position (compare FIG. 9) or in a completely pulled-out position (compare FIG. 10) can be possible. Fixing in the operating position (in the present case a completely closed position, compare FIG. 2, for example) can also be provided. A corresponding fixing arrangement 21 can preferably be designed using a spring-elastic latching lever 17 and a latching recess or an offset 22 for the latching lever 17 in order to provide releasable fixing of the pulled-out position of the patch panel 2 between the two mounting rails 8, 9. A magnetic fixing arrangement 21 (compare FIG. 4) can also be possible in principle. In the exemplary embodiments, the latching lever 17 is in each case formed on the functional component 8b, 9b.

In the exemplary embodiments, the sliding blocks or second connecting partners 20 are each formed in one part with the latching lever 17 of the fixing arrangement 21 of the mounting rail 8, 9 in order to unlock the linear guide.

It should be mentioned at this juncture that the linear guide pair, i.e., for example, the combination of guide groove or first connecting partner 19 and sliding block or second connecting partner 20, can optionally also extend over the entire length of the side surface 18 of the patch panel 2 and/or the entire length of the mounting rail 8, 9, even if this is not illustrated in the exemplary embodiment.

Figure 12:
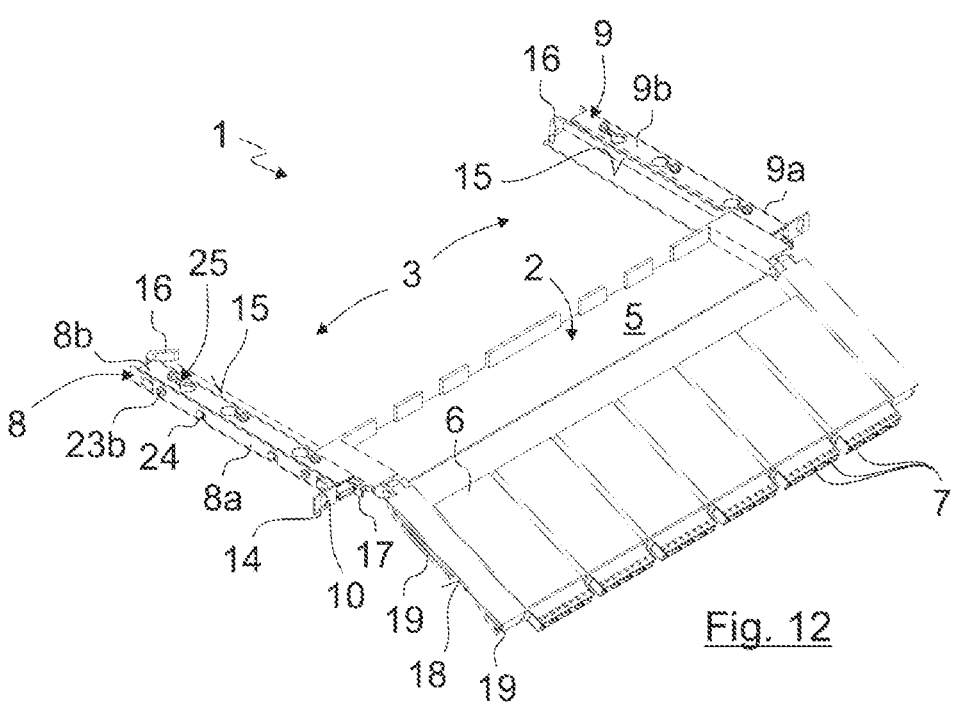
FIG. 12 shows a carrier arrangement with a pivotable patch panel according to a third exemplary embodiment, in a partially extended state of the patch panel.

The invention is also suitable particularly advantageously for use with patch panels 2 which are pivotable or which can be folded over, as illustrated in FIG. 12. Folding over can therefore take place either in the partially pulled-out position or completely pulled-out position of the patch panel 2 in order to further improve the accessibility.

The multi-part mounting rails 8, 9 can preferably have a latching connection between the profile rail 8a, 9a and the corresponding functional component 8b, 9b. For this purpose, the profile rail 8a, 9a has a plurality of connecting elements (latching recesses 23a in the exemplary embodiment) and the functional component 8b, 9b has a plurality of appropriately corresponding connecting elements (latching elements 23b in the exemplary embodiment) in order to produce a mechanically stable and if required dismountable connection between the profile rail 8a, 9a and the functional component 9a, 9b.

An option for mechanically stiffening the carrier arrangement 1 will be presented below with reference to FIGS. 5 to 10. In particular if a plurality of patch panels 2 are intended to be mounted stacked one above another, it can be advantageous to mechanically reinforce the respective mounting rails 8, 9. For this purpose, firstly, folded-over edges 24 can be provided along the longitudinal axis (compare in particular FIGS. 5 and 6). Alternatively or additionally, provision can be made that the mounting rails 8, 9 each have at least one connecting device 25 (compare, for example, FIG. 6). In the exemplary embodiments, in each case three connecting devices 25 are provided by way of example. The connecting devices 25 are each designed to mechanically connect the respective mounting rail 8, 9 to a directly adjacent further mounting rail 8, 9 arranged above and/or below it.

Figure 8:
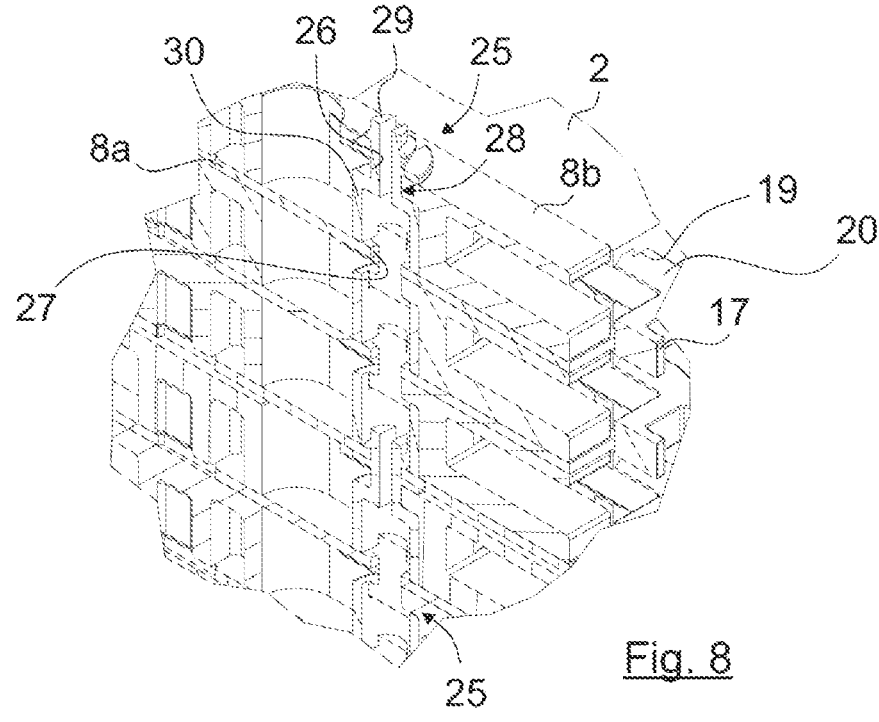
FIG. 8 shows a sectional illustration through the mechanical connections of the connecting devices of FIG. 7.

The mounting rail 8, 9 has, per connecting device 25, in each case a top-side connecting recess 26 and a bottom-side connecting recess 27 which are each arranged in alignment with one another (compare sectional illustration in FIG. 8). In the exemplary embodiments, the top-side connecting recess 26 is formed in the functional components 8b, 9b and the bottom-side connecting recess 27 in the profile rail 8a, 9b. The connecting recesses 26, 27 are each realized as combination of passage bore and elongate hole. In order to connect the mounting rails 8, 9, a connecting means 28 is in each case provided which is designed as a separate connecting member and which can be mounted with at least one first end portion 29 in one of the connecting recesses 26, 27 and additionally can be latched to the respective other connecting recess 27, 26 of an adjacent rail arrangement 3. The latching first end portion 29 is thus able to expand after penetrating the opposite connecting partner, as a result of which a form fit can be provided. If therefore a plurality of mounting rails 8, 9 are connected together to form a stack/to form a rail assembly or to form a register, the connecting member or the connecting means 28 engages from one functional component 8b, 9b in the basic profile of the mounting rail 8, 9 located thereabove and expands. The connection creates an increased mechanical stability of the overall assembly and prevents the patch panel 2 from sagging or being distorted when it is fully populated. The connecting member or connecting means 28 can preferably be formed on a second end portion 30 and can receive the first end portion 29 of a connecting member or connecting means 28 of an adjacent rail arrangement 3 therein (compare FIG. 8).

The proposed connecting device 25 is suitable particularly advantageously for a narrowly spaced-apart arrangement of patch panels 2. In order to ensure that even the topmost unit of the entire register makes up no more than one third (⅓) of a height unit U, the connecting members or connecting means 28 can be removable since a connecting member or connecting means 28 leading further is generally not required for the topmost unit of the stack—in this way, the construction space can be further optimized.

Optionally, however, spacers can also be provided (not illustrated in the figures). Said spacers make it possible to counter the offset of the screw connection positions, which offset occurs in many types of distribution frames 11, at spacings of one height unit U. The spacers can be designed as an additional component or formed in one part with the connecting members 28.

Alternative variants of a connecting device 25 are also possible within the context of the invention, for example a connecting means 28 of plate-like or rail-shaped design (indicated by way of example by dashed lines in FIG. 7) which is fastenable to the side surfaces of the mounting rails 8, 9 to be connected. For this purpose, the plate-like or rail-shaped connecting means 28 and the mounting rails 8, 9 can have, for example, respective bores in order to permit a suitable screw connection, latching connection or plug-in connection.

FIG. 13 illustrates a distribution frame 11 in which a plurality of rail arrangements 3 are arranged in order to realize respective slots or trays for patch panels 2 at a small spacing at different height positions H. However, a vertical or oblique arrangement is also possible, as already mentioned. The individual mounting rails 8, 9 of the respective rail arrangements 3 are in each case correspondingly connected to the vertical struts 12 of the distribution frames 11.

Finally, FIG. 14 shows a fiber-optic distribution system 31 with the distribution frame 11 and a plurality of carrier arrangements 1. According to the invention, the connection density can be extremely great, with simultaneously good accessibility. The construction space in the distribution frame 11 can be utilized virtually optimally.

While the invention has been described with reference to various preferred embodiments, it should be understood by those skilled in the art that various changes may be made and equivalents substituted for elements thereof without departing from the scope of the invention. In addition, many modifications may be made to adapt to a particular situation or application of the invention without departing from the scope of the invention. Therefore, it is intended that the invention not be limited to the particular embodiments disclosed but rather, that the invention will include all embodiments falling within the scope of the appended claims, either literally or under the Doctrine of Equivalents.

What is claimed is:

1. A rail arrangement for mounting a carrier unit for a fiber-optic component to a distribution frame, said rail arrangement comprising:

a first mounting rail and a second mounting rail, the first mounting rail and the second mounting rail being separate from one another and being spaced apart from each other and being designed to jointly receive the carrier unit between the first mounting rail and the second mounting rail, the first mounting rail having at least one first fastening point for fastening the first mounting rail to the distribution frame, the second mounting rail having at least one second fastening point for fastening the second mounting rail to the distribution frame; and a connecting device that mechanically connects at least one of the first mounting rail and the second mounting rail directly to at least one adjacent, further mounting rail of a further rail arrangement.

2. A rail arrangement as claimed in claim 1, wherein the carrier unit is guided movably along an insertion direction by the first mounting rail and the second mounting rail.

3. A rail arrangement as claimed in claim 2, wherein at least one of the first mounting rail and the second mounting rail has a movement limiting means which limits a movement of the carrier unit in the insertion direction.

4. A rail arrangement as claimed in claim 3, wherein the movement limiting means comprises an elastic movement limiting means which elastically limits movement of the carrier unit in the insertion direction and allows the carrier unit to move in a direction which is opposite the insertion direction by being temporarily bent over by the carrier unit without being destroyed.

5. A rail arrangement as claimed in claim 2, wherein at least one of the first mounting rail and the second mounting rail has a movement limiting means which limits a movement of the carrier unit in a direction which is opposite the insertion direction.

6. A rail arrangement as claimed in claim 1, wherein the first mounting rail and the second mounting rail each have a respective supporting surface which supports the carrier unit received between the mounting rails.

7. A rail arrangement as claimed in claim 1, wherein the first mounting rail and the second mounting rail each have an overall height which does not exceed one mounting height unit of the distribution frame.

8. A rail arrangement as claimed in claim 7, wherein the overall height does not exceed (n−1)/n of a height unit, wherein n is a natural number greater than 1.

9. A rail arrangement as claimed in claim 1, wherein the first mounting rail and the second mounting rail each have means for increasing their mechanical rigidity.

10. A rail arrangement as claimed in claim 9, wherein the means for increasing mechanical rigidity comprises one or more folded-over edges.

11. A rail arrangement as claimed in claim 1, further comprising at least one connecting device designed to mechanically connect at least one of the first mounting rail and the second mounting rail to at least one adjacent, further mounting rail of a further rail arrangement.

12. A rail arrangement as claimed in claim 11, wherein the connecting device has at least one connecting means which is fastenable directly to at least one of (i) the first mounting rail and (ii) the further mounting rail of the further rail arrangement.

13. A rail arrangement as claimed in claim 1, wherein the first fastening point comprises an elongate bore located on an end portion of the first mounting rail and wherein the second fastening point comprises an elongated bore located on an end portion of the second mounting rail.

14. A rail arrangement as claimed in claim 1, wherein the first mounting rail and the second mounting rail are structurally mirror-symmetrical with one another.

15. A rail arrangement as claimed in claim 1, wherein the carrier unit comprises a fiber-optic patch panel.

16. A rail arrangement as claimed in claim 1, wherein the connecting device mechanically connects at least one of the first mounting rail and the second mounting rail directly to at least one adjacent, further mounting rail of a further rail arrangement by being vertically stacked therebetween.

17. A carrier arrangement, comprising:

a carrier unit, and a rail arrangement, the rail arrangement having a first mounting rail and a second mounting rail, the first mounting rail and the second mounting rail being spaced apart from each other, the carrier unit being received between the first mounting rail and the second mounting rail, the first mounting rail having at least one first fastening point for fastening the first mounting rail to a distribution frame, the second mounting rail having at least one second fastening point for fastening the second mounting rail to the distribution frame, the carrier unit being mounted to the distribution frame by way of the rail arrangement; and a connecting device that mechanically connects at least one of the first mounting rail and the second mounting rail directly to at least one adjacent, further mounting rail of a further rail arrangement.

18. A carrier arrangement as claimed in claim 17, further comprising a linear guide pair located between a side surface of the carrier unit and at least one of the first mounting rail and the second mounting rail, the linear guide pair having a first connecting partner and a second connecting partner, the first connecting partner comprising a guide groove, the second connecting partner comprising a sliding block.

19. A carrier arrangement as claimed in claim 17, further comprising a fixing arrangement formed between a side surface of the carrier unit and at least one of the first mounting rail and the second mounting rail for fixing the carrier unit in a position along an insertion direction, the position being at least one of a pulled-out position and an operating position.

20. A carrier arrangement as claimed in claim 17, wherein the connecting device mechanically connects at least one of the first mounting rail and the second mounting rail directly to at least one adjacent, further mounting rail of a further rail arrangement by being vertically stacked therebetween.

21. A fiber-optic distribution system, comprising:

a distribution frame and a plurality of carrier units, each of the carrier units being fastened to the distribution frame in a respective one of a plurality of different height positions by way of a respective one of a plurality of rail arrangements, each of the rail arrangements having a respective first mounting rail and a respective second mounting rail, the first mounting rail and the second mounting rail being spaced apart from each other, a respective one of the carrier units being received between the first mounting rail and the second mounting rail, the first mounting rail having at least one first fastening point for fastening the first mounting rail to the distribution frame, the second mounting rail having at least one second fastening point for fastening the second mounting rail to the distribution frame; and a connecting device that mechanically connects at least one of the first mounting rail and the second mounting rail directly to at least one adjacent, further mounting rail of a further rail arrangement.

22. A fiber-optic distribution system as claimed in claim 21, wherein the connecting device mechanically connects at least one of the first mounting rail and the second mounting rail directly to at least one adjacent, further mounting rail of a further rail arrangement by being vertically stacked therebetween.

23. A rail arrangement for a carrier unit for a fiber-optic component, said rail arrangement comprising:

a first mounting rail and a second mounting rail the first mounting rail and the second mounting rail being separate from one another and being spaced apart from each other and being designed to jointly receive the carrier unit between the first mounting rail and the second mounting rail, the first mounting rail having at least one fastening point for fastening the first mounting rail to a distribution frame, the second mounting rail having at least one second fastening point for fastening the second mounting rail to the distribution frame, wherein the first mounting rail and the second mounting rail each have an L-shaped profile, the L-shaped profile having a respective supporting surface on which the carrier unit sits when received between the mounting rails.

* * * * *